United States Patent [19]

Nemeth

[11] Patent Number: 5,724,914
[45] Date of Patent: Mar. 10, 1998

[54] DOG FEEDER WITH EAR-DEFLECTING, ROTATABLE COVER

[75] Inventor: David A. Nemeth, Upland, Calif.

[73] Assignee: Tidy Feed Industries, Inc., Las Vegas, Nev.

[21] Appl. No.: 751,082

[22] Filed: Nov. 15, 1996

[51] Int. Cl.⁶ ..................................................... A01K 5/00
[52] U.S. Cl. ............................................................. 119/61
[58] Field of Search ................................ 119/61, 74, 72, 119/73, 69.5, 51.5

[56] References Cited

U.S. PATENT DOCUMENTS

| D. 300,278 | 3/1989 | Morrell | D30/129 |
|---|---|---|---|
| 1,014,490 | 1/1912 | Lamdin . | |
| 2,617,385 | 11/1952 | Clark . | |
| 3,152,576 | 10/1964 | Faurot . | |
| 3,455,280 | 7/1969 | Keene . | |
| 3,589,340 | 6/1971 | Beilles | 119/61 |
| 3,653,362 | 4/1972 | Davis | 119/61 |
| 3,810,446 | 5/1974 | Kightlinger et al. | 119/61 |
| 4,270,490 | 6/1981 | Kopp | 119/61 |
| 4,800,845 | 1/1989 | Budd | 119/61 |
| 5,209,184 | 5/1993 | Sharkan et al. | 119/61 |

*Primary Examiner*—Jeffrey A. Smith
*Assistant Examiner*—Yvonne R. Abbott
*Attorney, Agent, or Firm*—William W. Haefliger

[57] ABSTRACT

A pet feeder device comprising a bowl-shaped base, defining an upright central access; a cover extending over the base, the cover having a vertical opening through which a pet's nose may be projected to access food in the base, the opening extending eccentrically relative to the access; the cover having an annular rim portion supported on the base to allow cover rotation relative to the base, as the pet's snout in the opening pushes sidewardly on the cover; and structure associated with the rim portion to provide releasable connection thereof to the base.

13 Claims, 3 Drawing Sheets

DOG FEEDER WITH EAR-DEFLECTING, ROTATABLE COVER

BACKGROUND OF THE INVENTION

This invention relates generally to dog feeder devices, and more particularly concerns improved feeder apparatus having a rotatable cover over a bowl, enabling the pet to easily rotate the cover while the pet's snout penetrates downwardly through an opening in the cover to gain access to food in the bowl.

There is need for dog or pet feeders enabling easy access to food in a bowl, with a cover extending over the bowl to prevent the dog's ears from touching the food and then requiring cleansing.

There is also need for bowl covers which are easily rotatable by the pet as it feeds; and there is additional need for such covers which can be easily removed from the bowl to enable cleaning and food replacement.

SUMMARY OF THE INVENTION

It is a major object of the invention to provide a feeder apparatus meeting the above needs, as well as others, as will be seen.

It is an additional object of the invention to provide a pet feeder device comprising:

a) a bowl-shaped base, defining an upright central axis, b) a cover extending over the base, the cover having a vertical opening through which a pet's nose may be projected to access food in the base, the opening extending eccentrically relative to the upright axis, c) the cover having an annular rim portion supported on the base to allow cover rotation relative to the base, as the pet's snout in the opening pushes sidewardly on the cover, d) and means associated with the rim portion to provide releasable connection thereof to the base.

As will be seen, the cover preferably has dome-shape and consists of molded plastic material. In this regard, the means to provide releasable connection of the cover rim portion to the base typically comprises connection elements on the cover and base allowing detenting upward release of the cover on the base. In this regard, the cover is typically flexible to enable such detenting release.

The connection elements may include multiple connectors on the cover rim portion and spaced about the vertical axis of the dome and base; the connectors also have the additional function of providing bearings easily slidable along an angular edge or rim formed by the base. That rim typically extends beneath an annular guide and holder for the connectors, allowing retention of the holders and cover to the base, while enabling camming upward release of the connectors from the annular holder, whereby a simple, combined bearing retention, and cover release structure is provided. Such structure also may allow fall-off of any food particles or pieces, or liquid, spilling over the edge of the bowl and toward the connectors and ledge.

These and other objects and advantages of the invention, as well as the details of an illustrative embodiment, will be more fully understood from the following specification and drawings, in which:

DRAWING DESCRIPTION

DETAILED DESCRIPTION

Figure 1:
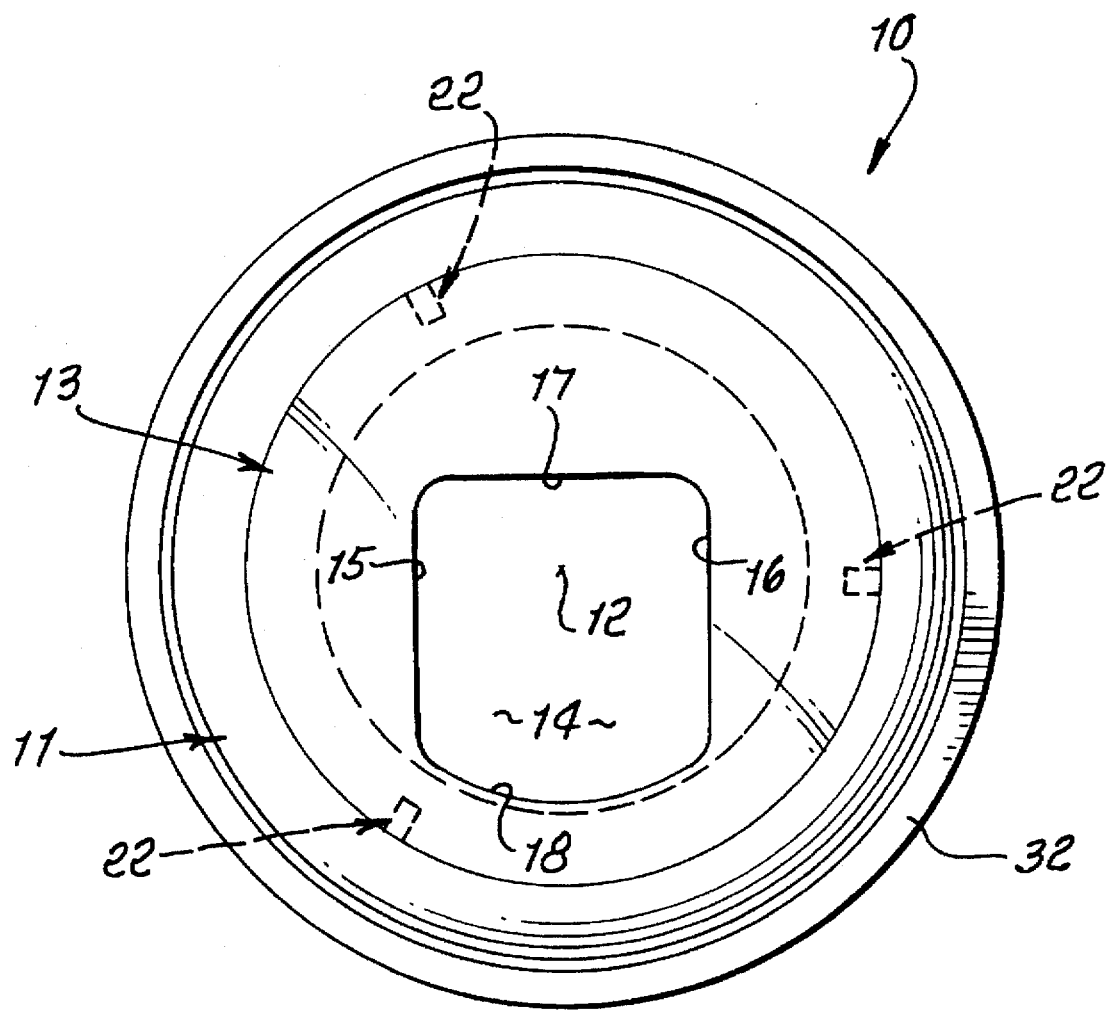
FIG. 1 is a top plan view of a device incorporating the invention.
Figure 2:
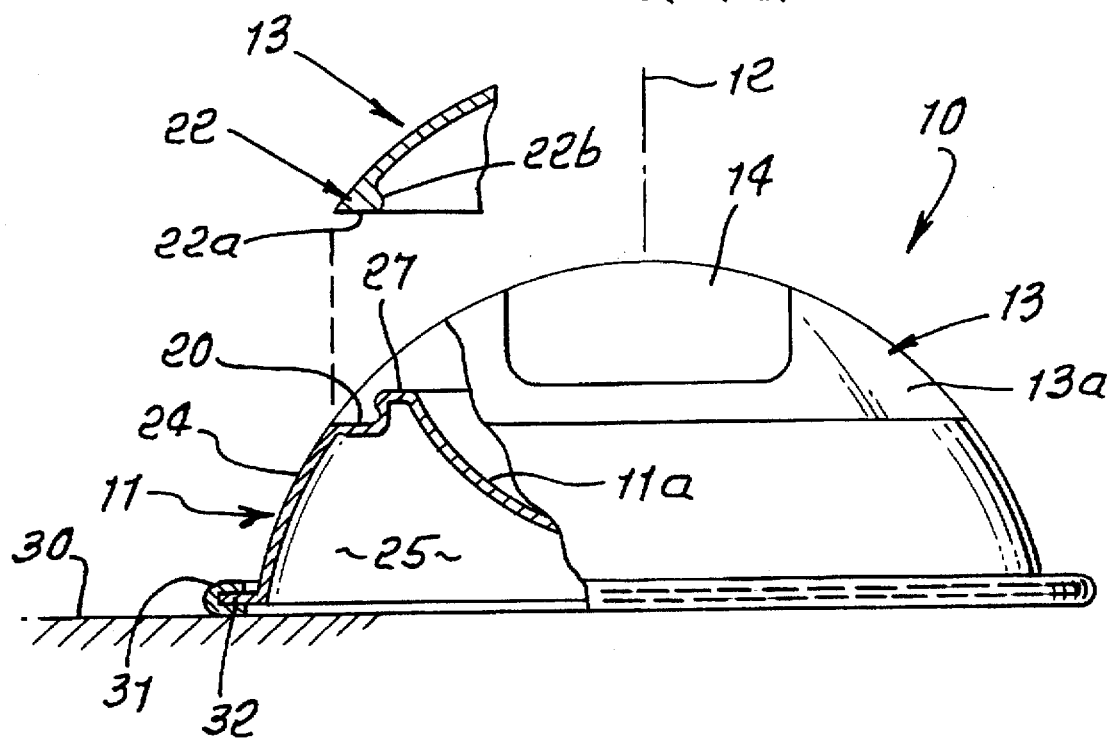
FIG. 2 is a side elevation taken on lines 2—2 of FIG. 1, and showing in fragmentary view the released portion of the cover relative to the bowl or base.

Referring to FIGS. 1 and 2, the pet feeder device 10 includes a bow-shaped base 11 defining an upright central axis 12. A cover 13 extends over the base, the cover having a vertical opening 14 through which the pet's nose or snout may be downwardly projected to gain access to food in the bowl-shaped portion 11a of the base. That opening extends eccentrically relative to axis 12, as is clear from FIG. 1, the opening having parallel arcuate side edges 15 and 16, and upper edge at 17 at one side of axis 12, and a lower edge 18 at the opposite side of the axis. Edge 18 is spaced much further from the axis 12 than edge 17. The cover is dome-shaped and may consist of a thin, plastic, transparent sheet 13a having a lower edge 13b extending adjacent an annular ledge 20 defined by the base. The cover is generally resiliently flexible to allow ready snap-release, i.e., detenting release, from the base, as by manual grasping via the opening 14 and its edges, to pull the cover upwardly from the base.

Support of the cover edge 13b on the annular ledge allows ready rotation of the cover relative to the base about axis 12, as the pet's snout in the opening 14 pushes sidewardly on the cover, i.e., against cover edge 15 or edge 16.

Means is provided on the cover, and in association with its rim portion or edge 13b, to provide releasable connection of the cover to the base, while also accommodating the ready slidable and guided rotation of the cover rim portion 13b on the ledge 20; and additionally accommodating ready detent release of the cover from the base, i.e., multiple functions in a very simple structure. In the example shown, such means comprises connection elements on the cover and base allowing detenting upward release of the cover, as referred to. The connection elements on the cover include multiple connectors 22 spaced, for example, at 120° intervals, as seen in FIG. 1. Three such connectors, as shown, may be molded integrally with the cover to project inwardly toward axis 12 relative to the cover lower rim 13b, the lower surfaces of such connectors appearing at 22a, being slidably engageable with the ledge to provide three-point support for the cover on the ledge, as desired, whereby a loose bearing support for the cover is enabled so that the pet may easily push the cover about axis 12.

Figure 3:
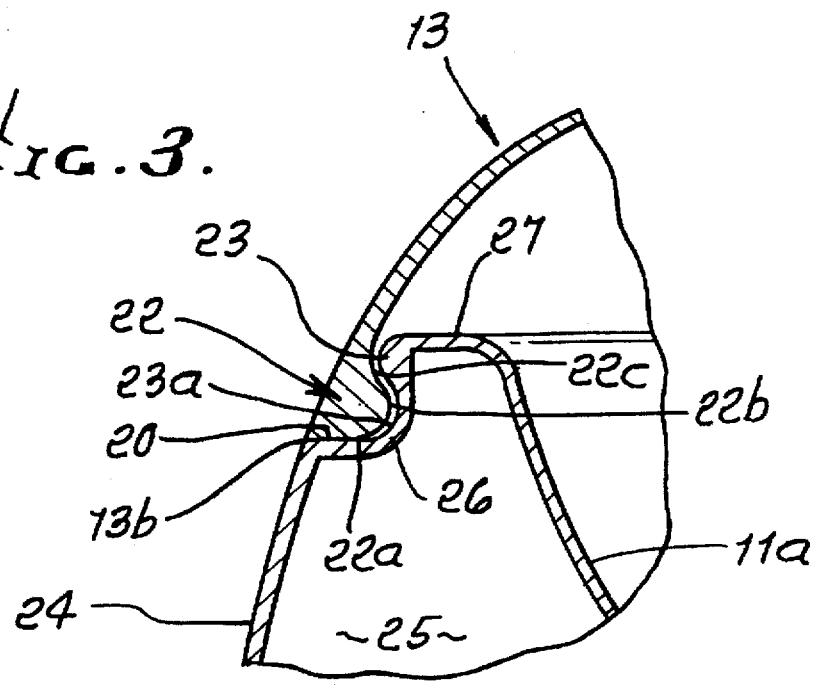
FIG. 3 is an enlarged fragmentary elevation taken in section to show retention of a connector on the cover to an annular holder on the base, together with bearing engagement of the connector with a ledge on the base.
Figure 4:
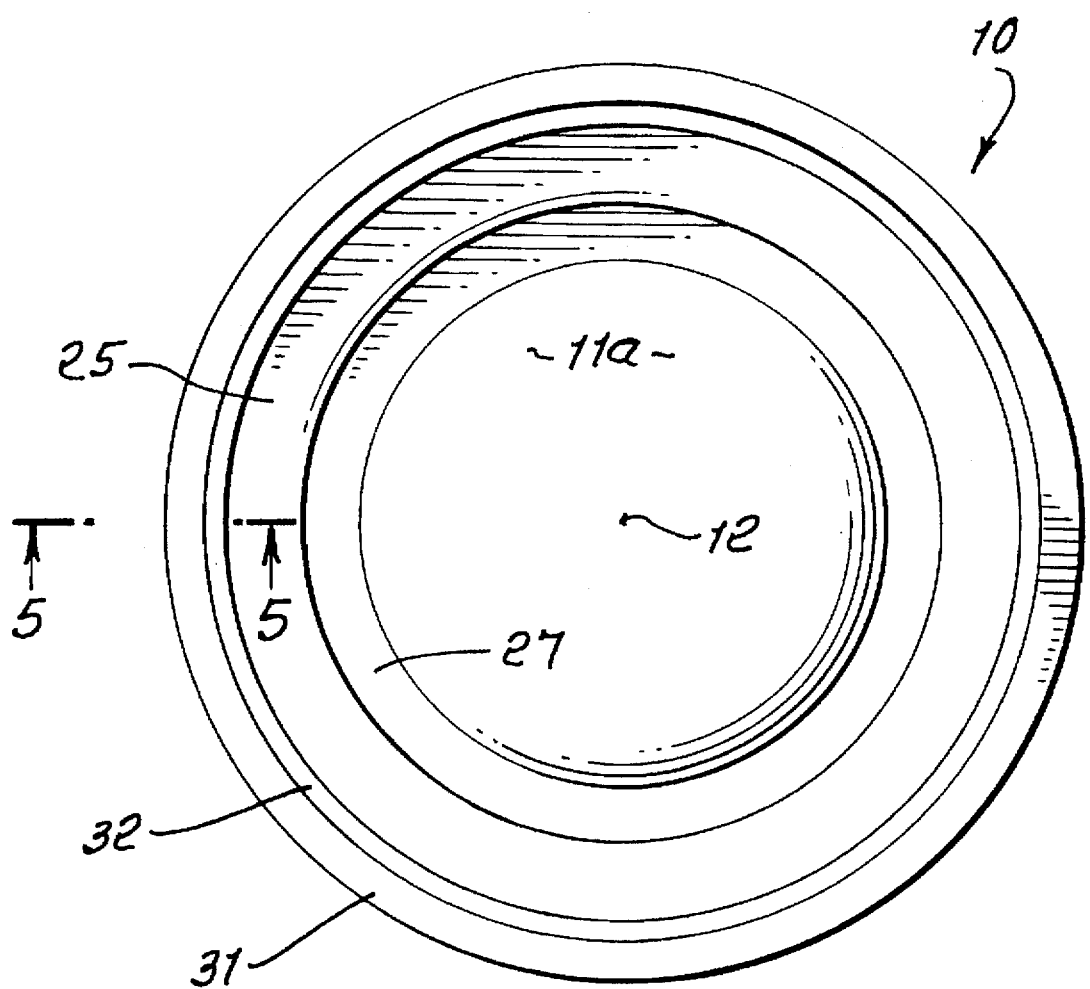
FIG. 4 is a bottom view of the device of FIGS. 1–3.
Figure 5:
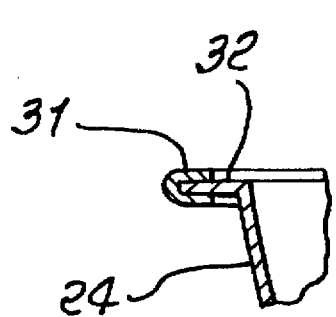
FIG. 5 is a section taken on lines 5—5 of FIG. 4, and inverted for showing a non-skid means on the base.

At the same time, the connectors have protrusions 22b toward axis 12, which loosely fit (with clearance) beneath an annular holder element on the base indicated at 23, so that a loose, dove-tailed interfit is achieved, as shown in FIG. 3. See the convex protrusion 22b loosely interfitting the concave annular recess 23a in the base immediately below the annular holder 23. Similarly, that holder has an outwardly protruding, convex surface 23b loosely interfitting an inwardly concave annular recess 22c at the locus of upward merging of the connector 22 with the cover 13. Loose, S-shaped cross section interfits are thereby defined.

As the cover is lifted, the annular protrusion 22b rides upwardly and cams over the outward protrusion 23b defined by the annular holder, flexing of the cover accommodating such camming and resiliently and yieldably resisting such camming to allow easy detenting release of the cover from the base, for cleaning, food re-filling, etc. In this regard, portions of the cover extending between the connectors and above same may resiliently flex to accommodate the release, due to the thin construction of the cover.

It is also seen that the protrusions 22 may easily ride downwardly over the annular holder 23 during push-down assembly of the cover to the base, in view of their arcuate profiles, as seen in FIG. 3. Thus, protrusions 22 may ride or cam downwardly over annular protrusion 23 in the assembly process, at any position of the cover about axis 12.

The base 11 is easily formed, as by molding to have the shape of an upwardly re-entrant shell with outer wall 24, bowl wall 11a, re-entrant recess 25 therebetween, and walls 26 and 27, as shown, the latter projecting upwardly above the level of connectors 22. Wall 27 provides an annular dam blocking food direct access to the interfits at 22c and 23b, and at 22b and 23a. Such interfits block access of food to bearing surfaces at 22a and 20. A lightweight, easily handled and cleaned and maintained bowl and cover are thereby provided.

To prevent slippage of the bowl or base on a support surface 30, as seen in FIG. 2, a rubber rim 31 or other similar support is provided on the flange 32, integral with the base and projecting outwardly, as shown. The rim frictionally engages surface 30 to prevent base slippage, as the pet rotates the cover about the axis 12.

I claim:

1. A pet feeder device comprising, in combination:
   a) a bowl-shaped base, defining an upright central axis,
   b) a cover extending over said base, the cover having a vertical opening through which a pet's nose may be projected to access food in the base, said opening extending eccentrically relative to said axis,
   c) the cover having an annular rim portion supported on the base to allow cover rotation relative to the base, as the pet's snout in said opening pushes sidewardly on the cover,
   d) and means associated with said rim portion to provide releasable connection thereof to the base,
   e) there being support surfaces on the cover and the base allowing rotatable sliding of the cover on the base, said support surfaces including an annular ledge on one of the cover and base, and annularly spaced protrusions on the other of said cover and base, said protrusions slidably engaging said annular ledge, and there being protective structure projecting adjacent and above the level of the ledge for blocking access of food in the base to said ledge.

2. The combination of claim 1 wherein said cover has dome shape and consists of molded plastic material.

3. The combination of claim 1 wherein said means comprises connection elements on the cover and base, allowing detenting upward release of the cover from the base.

4. The combination of claim 3 wherein said cover is flexible to provide said detenting release.

5. The combination of claim 1 wherein said cover is transparent.

6. The combination of claim 3 wherein said connection elements on the cover include multiple connectors on said cover rim portion and spaced about said axis.

7. The combination of claim 6 wherein said connection elements include an annular holder on the base and projecting to be releasably engageable by said connection elements on the cover.

8. The combination of claim 7 wherein said holder defines an outwardly convex surface, and said connection elements on the cover have concave surfaces to loosely interfit said convex surface on the holder.

9. The combination of claim 7 wherein said base defines an annular, concave surface forming a recess opening outwardly toward said connection elements on the cover, said connection elements on the cover defining said protrusions having convex surfaces loosely interfitting said concave surface on the base.

10. The combination of claim 9 wherein said connection elements on the cover and base define S-shaped cross section upright interfits.

11. A pet feeder device comprising, in combination:
    a bowl-shaped base, defining an upright central axis,
    a cover extending over said base, the cover having a vertical opening through which a pet's nose may be projected to access food in the base, said opening extending eccentrically relative to said axis,
    c) the cover having an annular rim portion supported on the base to allow cover rotation relative to the base, as the pet's snout in said opening pushes sidewardly on the cover,
    d) and means associated with said rim portion to provide releasable connection thereof to the base,
    e) said means comprising connection elements on the cover and base, allowing detenting upward release of the cover from the base,
    f) said connection elements including multiple connections on said cover rim portion and spaced about said axis, said connection elements including an annular holder on the base and projecting to be releasably engageable by said connection elements on the cover,
    g) said base defining an annular, concave surface forming a recess opening outwardly toward said connection elements on the cover, said connection elements on the cover defining protrusions having convex surfaces loosely interfitting said concave surface on the base,
    h) said connection elements on the cover and base define S-shaped cross section upright interfits,
    i) and wherein said base defines a ledge projecting outwardly from lowermost extents of said S-shaped cross section interfits for supporting lowermost extents of said connection elements on the cover for slidable bearing engagement therewith.

12. The combination of claim 11 wherein said base defines an annular dam extending upwardly and inwardly toward said axis from a level defined by uppermost extents of said S-shaped cross section interfits.

13. The combination of claim 1 wherein said base has a support flange extending at least part way about said axis, there being an elastomer surface on said flange to engage a floor in non-slip relation.

* * * * *